(12) United States Patent
Alberth, Jr. et al.

(10) Patent No.: US 6,427,077 B1
(45) Date of Patent: Jul. 30, 2002

(54) GPS ENABLED MOBILE STATIONS AND LOCATION METHODS THEREFOR

(75) Inventors: William P. Alberth, Jr., Crystal Lake; Michael Kotzin, Buffalo Grove; Scott Droste, Crystal Lake, all of IL (US)

(73) Assignee: Motorola, Inc., Schaumburg, IL (US)

( * ) Notice: Subject to any disclaimer, the term of this patent is extended or adjusted under 35 U.S.C. 154(b) by 42 days.

(21) Appl. No.: 09/770,873

(22) Filed: Jan. 26, 2001

(51) Int. Cl.$^7$ ................................................. H04B 7/185
(52) U.S. Cl. ...................... 455/456; 455/427; 455/181.1
(58) Field of Search ............................... 455/12.1, 13.1, 455/445, 458, 456, 422, 457, 181.1, 427, 428; 342/357.01, 357.02, 357.1, 357.11, 357.12

(56) References Cited

U.S. PATENT DOCUMENTS

| | | | |
|---|---|---|---|
| 4,860,005 A | | 8/1989 | Deluca et al. |
| 6,073,013 A | * | 6/2000 | Agre et al. ................. 455/456 |
| 6,144,336 A | * | 11/2000 | Preston ....................... 455/456 |

* cited by examiner

*Primary Examiner*—Thanh Cong Le
(74) *Attorney, Agent, or Firm*—Roland K. Bowler II

(57) ABSTRACT

A satellite positioning system enabled mobile station and method therefor having a satellite positioning system signal reception interface, for example a GPS receiver, an information processor coupled to the satellite positioning system signal reception interface, the information processor controlling the satellite positioning system signal reception interface for receiving satellite positioning system signals upon which mobile station positioning may be determined based upon a satellite positioning system based position fix generation rate instruction.

28 Claims, 3 Drawing Sheets

US 6,427,077 B1

GPS ENABLED MOBILE STATIONS AND LOCATION METHODS THEREFOR

FIELD OF THE INVENTIONS

The present inventions relate generally to locating mobile stations, and more particularly to locating satellite positioning system enabled mobile stations.

BACKGROUND OF THE INVENTIONS

Locating cellular telephone handsets in cellular communication networks based on a satellite positioning system, for example the Navigation System with Time and Range (NAVSTAR) global positioning system (GPS), is one approach likely to be implemented for supporting enhanced emergency 911 (E-911) services, which will soon be mandatory in the United States of America.

Market driven forces are also motivating communications equipment manufacturers and service providers to more quickly and accurately locate cellular telephone handsets and other mobile stations, for example to provide promotional and fee based value-added services. Satellite positioning system based positioning will likely be among the contenders for many of these market opportunities.

Satellite positioning system enabled mobile stations generally require a satellite signal receiver interface, which draws power in some proportion to the rate at which satellite signals are received and location fixes are generated. Satellite positioning system based positioning schemes will thus reduce standby and talk time in battery-operated mobile stations, for example cellular telephone handsets.

Additionally, there will likely be service fees associated with at least some satellite positioning system based positioning schemes, for example those utilizing terrestrial network-assistance.

Reducing the frequency or rate at which the cellular handset generates and updates satellite positioning system based location fixes, for example, to conserve battery power and reduce costs associated therewith, generally increases the time required to obtain a position fix. In some applications, however, a substantial delay in the generation of a location fix is undesirable or unacceptable, for example in E-911 applications where the caller is in imminent danger, or where the mobile station is moving at a high rate of speed and will have changed its position significantly by the time a position fix is obtained.

The various aspects, features and advantages of the present inventions will become more fully apparent to those having ordinary skill in the art upon careful consideration of the following detailed description of the inventions in conjunction with the accompanying drawings, which are described below.

DETAILED DESCRIPTION OF THE INVENTIONS

In some embodiments of the present invention, a satellite positioning system based position fix generation rate in a satellite positioning system enabled cellular handset, and more generally in any other satellite positioning system enabled receiver, is selectively controlled to balance a desire for ready and/or more accurate location fix generation with a competing desire, for example, the desire to reduce power consumption or the desire to reduce costs associated with generation of the position fixes, among others.

In one embodiment of the invention, the generation of satellite positioning system based location fixes for a mobile station is selectively controlled based on one or more variable conditions, for example based on location and/or velocity of the mobile station, or based on the time of day, etc.

In one embodiment of the invention, a change in the variable condition results in a corresponding change in the rate at which the satellite positioning system based location fix of the mobile station is generated. The particular relationship between the one or more variable conditions and the location fix generation rate depends generally on the particular application.

In some embodiments of the invention, the relationship between the location fix generation rate and the variable condition is predefined, for example in a software program implemented on the mobile station. In other embodiments, the location fix generation rate is controlled from a network, for example a cellular communication network, or in response to a command from the network.

Figure 1:
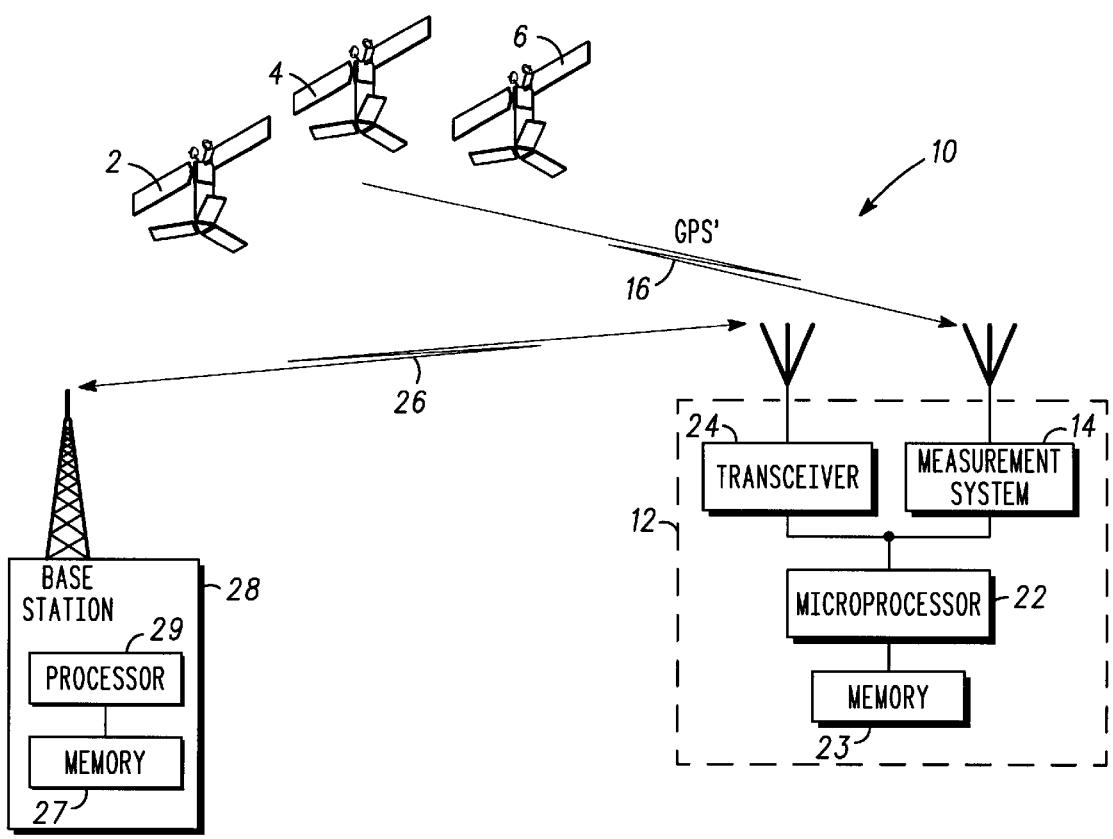
FIG. 1 is a GPS enabled cellular handset in a cellular communication network according to an exemplary embodiment of the invention.

In FIG. 1, the satellite positioning system comprises a constellation of earth orbiting satellites, only some of which, satellites 2, 4 and 6, are illustrated.

Known exemplary satellite positioning systems suitable for use with the present invention include, among others, the Navigation System with Time and Range (NAVSTAR) Global Positioning Systems (GPS) in the United States of America, the Global Orbiting Navigation System (GLONASS) in Russia, and the proposed European satellite positioning system.

Satellite positioning system based location fixes of a satellite positioning system enabled mobile station may be obtained autonomously or with assistance from terrestrial base stations, for example with assistance from a cellular communication network or other ground based network, or as part of a Differential Global Positioning System (DGPS), as is well known by those having ordinary skill in the art.

In the exemplary application of FIG. 1, a GPS enabled cellular handset 12 is located by a GPS based location fix in a cellular communication network having a plurality of bases stations, only one of which, base station 28, is illustrated.

Figure 2:
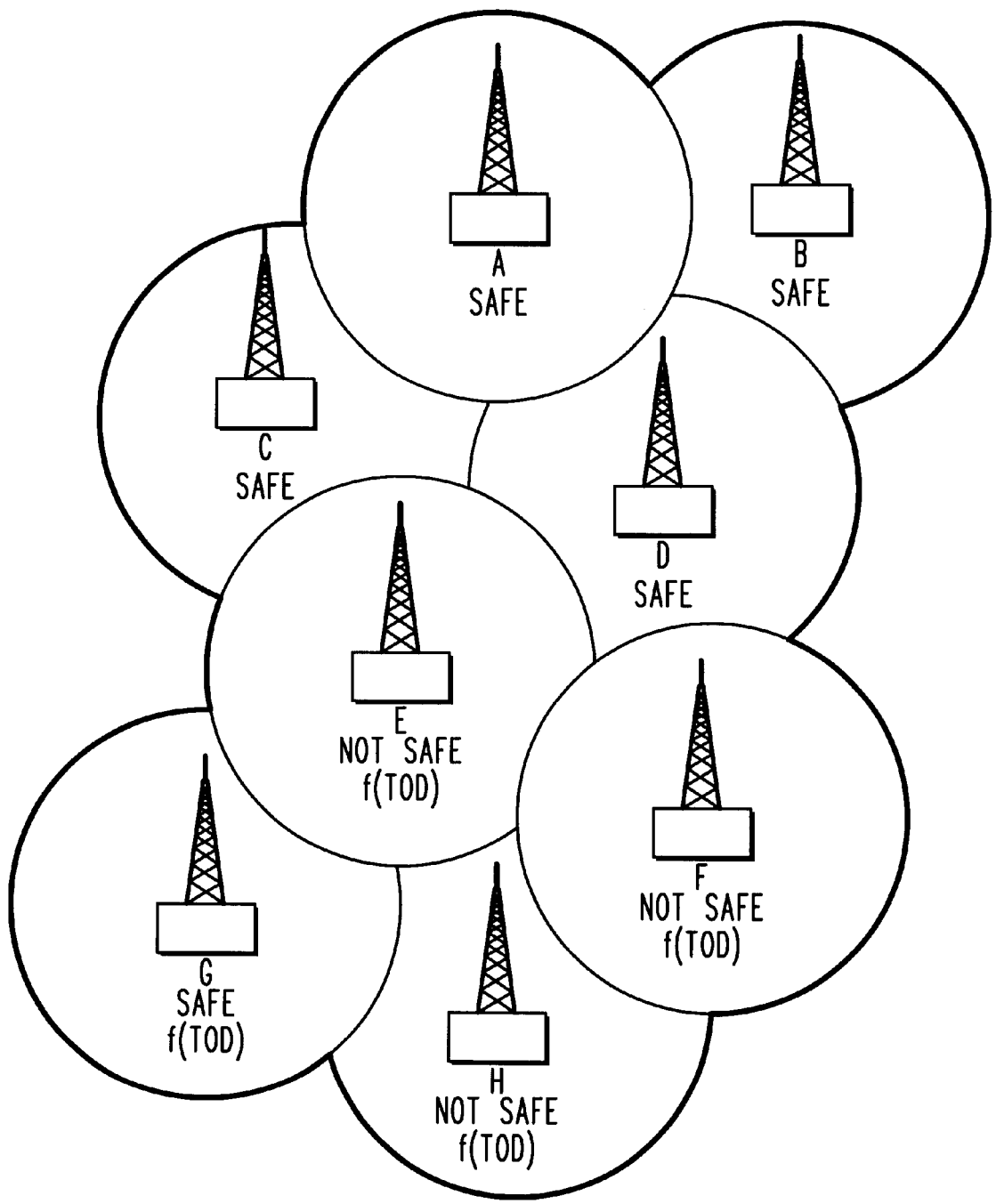
FIG. 2 is a cellular communication network having a plurality of cells with different cellular handset location fix generation rates according to an exemplary embodiment of the invention.

FIG. 2 illustrates an exemplary cellular communication network generally comprising a plurality of cells, including cells A, B, C, D, E, F, G and H, each of which includes a corresponding base station.

In FIG. 1, the cellular handset 12, referred to herein more generally as a "mobile station", comprises generally a satellite signal reception interface, for example, a GPS receiver measurement system (MS) 14, for receiving satellite signals 16 from which satellite based position fixes of the cellular handset are determined, either autonomously or with assistance or as part of a DGPS, as discussed above.

The cellular handset 12 also comprises generally a wireless communication network interface, for example, a receiver/transmitter (TXVR) 24 for communicating with the communication network, for example communications 26 to and/or from the base station, which may be a serving or neighboring base station, as the cellular handset moves about the cellular communication network.

The cellular handset also comprises generally an information processor 22 having memory 23 associated therewith. The processor 22 is coupled to the MS 14 and the TXVR 24 for processing information in association therewith.

The present inventions are useful for locating any satellite positioning system enabled mobile station, and are not limited to locating cellular handsets in cellular communication networks. Other applications include, for example, the location of GPS navigation and other satellite positioning system enabled handheld devices, also referred to herein more generally as mobile stations. Thus in some embodiments, the mobile station does not necessarily include the wireless communications interface.

In one embodiment, satellite positioning system based position fix generation rate instructions, embodied as software, are stored in memory at the mobile station or at the cellular communication network.

According to this exemplary embodiment, the processor controls the satellite positioning system signal reception interface for receiving satellite signals based on a variable condition under control of the satellite positioning system position fix generation rate instructions. The rate at which satellite signals are received at the mobile station, for generating satellite based positioning fixes, is at least as frequent as is required to generate location fixes at the rate specified by the location fix generation rate instructions.

In applications where the position fix generation rate instruction software is implemented at the network, location generation rate information is communicated to the mobile station via the network interface for use by the processor to control the rate at which the satellite interface operates to receive satellite signals. In some embodiments, location fix generation rate instructions originate from both the network and from the mobile station, and are implemented according to some predetermined prioritization.

In one application of the invention, different location fix generation rates are specified for corresponding portions of a geographical area, for example corresponding portions of a cellular communication network. The portions of the network may be a cell associated with a base station, or may be a smaller area within a cell or an area overlapping adjacent cells. These instructions are stored in the cellular handset or in the cellular communication network.

As the mobile station moves about, mobile station location fixes are generated at a rate based on the location of the mobile station. The location of the mobile station may be determined by any one of several positioning schemes.

In cellular communication networks, the location of the cellular handset may be determined by a network-based locating scheme, implemented either at the handset or at the cellular communication network. Known cellular communication network based positioning schemes include, among others, those based on network signal strength measurements at the cellular handset or on signal timing measurements made at the handset, e.g. by time of arrival (TOA) or time difference of arrival (TDOA) or by some other positioning scheme.

In these and other applications, the location fix generation rate may also be based upon, or a function of, the time of day (TOD) or some other variable, either alone or in combination with the exemplary location variable, discussed above.

In another embodiment, the mobile station user has the ability to customize, or program, the cellular handset to specify different location fix generation rates for different areas and/or for different time periods.

In one application, the location fix generation rate is based on a confidence level input by the user. For example, certain geographical areas of the network may be designated as being "safe", "somewhat safe", "not safe", etc. based on the personal experience of the user. These exemplary designations may be made to identify safe neighborhoods or alternatively to identify an area where the user is recreating and would like a heightened degree of positioning readiness in the event of an emergency.

In one embodiment, the cellular handset, or mobile station, is programmed by the user when the mobile station is in a training mode. The user may specify a confidence level designation for one or more locations by making a menu entry at the cellular handset when the handset is in a particular location, at which time a corresponding location fix may also be generated to correlate the confidence level designation with a particular location.

In some embodiments, the user is also able to specify the area associated with the safety designation, for example by specifying a radius from the location from which the safety designation was made. This selection may also be made, for example, in response to a menu prompt displayed when the cellular handset is in the training mode. In other embodiments, the safety designation applies to a default area or radius, for example a mile or so, from the location from where the confidence level designation was made.

The designated confidence levels each have a corresponding location fix generation rate. In the exemplary application, less safe designations have higher location fix generation rates. Thus relatively quick location fixes are generated when the user is in less safe areas, at the cost of increased power usage, and location fixes are generated less quickly when the user is in safer areas.

Also, the safety designation may have associated therewith a time attribute, which may also be entered by the user in response to a menu prompt in the training mode. The confidence level designations may apply in some areas only during a certain time period, for example in the evening and early morning hours.

Alternatively, the location fix generation rates and any TOD attributes are mapped graphically on a computer with a program that converts graphical mapping information to location coordinate data with corresponding location fix generation rate attributes. The converted mapping is then loaded onto memory in the mobile station or cellular handset via the Internet, a smart card, Bluetooth, Irda, etc, or by some other means for use with the location fix generation rate instructions.

In the cellular communication network of FIG. 2, cells A, B, C, D and G have been designated as "safe", and cells E, F and H have been designated as "not-safe". Additionally, the safety designations of cells E, F, G and H are a function of the time of day (TOD). When the time is outside the specified TOD, the location fix generation rate may revert from the rate corresponding to the safety designation to some other rate, for example a default rate.

In FIG. 2, the safety designations apply to the entire cells, for example, based on an identification of a base station serving the cellular handset, but more generally they need not be so constrained. The user may, for example, make many different safety designations corresponding to different locations within one or more cells, as the user moves about the communication network. Alternatively, these designations may be pre-programmed, for example by a cellular service provider. In areas where no safety designation is made, the location fix generation rate may revert to a default rate.

As the cellular handset moves about the cellular communication network, its position is determined, for example, by a satellite or network based positioning method.

The location fix of the cellular handset is generated at the location fix generation rate specified for the portion or area of the cellular communication network within which the cellular handset is located. More generally, location fixes of a mobile station are generated at the location fix generation rate specified for the portion of the geographical area, which is not necessarily part of a cellular communication network, within which the mobile station is located.

In other embodiments, the location fix generation rate applied to the cellular handset will be based upon the location generation rate specified for the location to which the cellular handset is nearest. In the exemplary confidence level application, for example, if the cellular handset is closer to a "safe" location than it is to an "unsafe" location, the location fix generation rate of the cellular handset will be that designated or specified for the "safe" location.

More generally, other criteria, besides safety, may be used for specifying the location fix generation rate. The location fix generation rate may be specified based on one or more continuously or discretely changing variable conditions.

In another embodiment, the location fix generation rate is based on a velocity of the mobile station or the cellular handset. According to this embodiment, a velocity of the mobile station is determined periodically and the location fix of the mobile station is generated at a rate based on the most recent velocity determination.

The velocity of the mobile station may be determined based on satellite positioning system measurements or by other known methods. In the cellular communication network application, the velocity of the cellular handset is determined by measuring a fading pitch of a base station signal received at the handset from the cellular communication network, as is well known to those having ordinary skill in the art. In this embodiment, the variable condition is the velocity of the mobile station or cellular handset.

Figure 3:
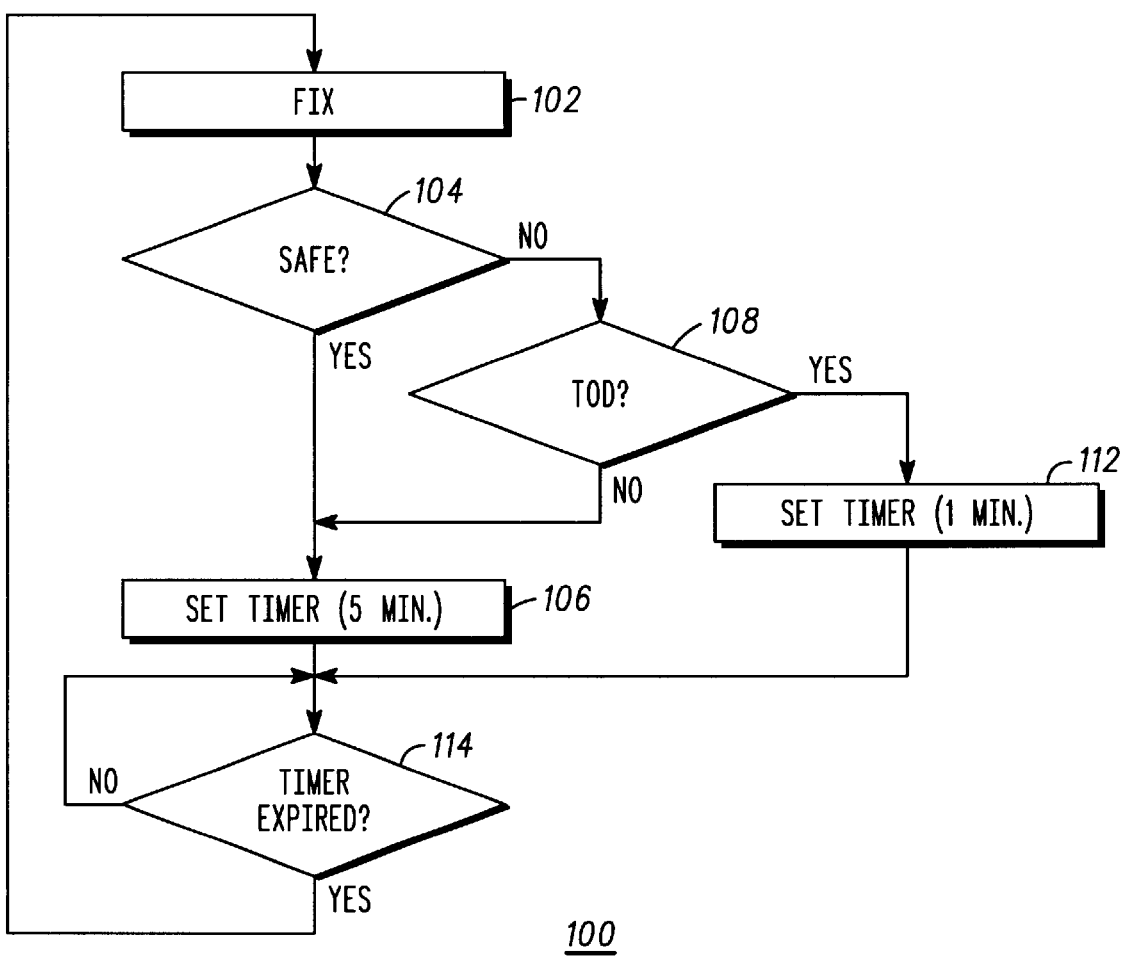
FIG. 3 is a process flow diagram according to an exemplary implementation of the invention.

FIG. 3 is an exemplary flow diagram 100 for generating satellite positioning system based location fixes for a cellular handset based on several variable conditions, including confidence level designations and time of day.

In FIG. 3, the handset generates a location fix at block 102. At block 104, it is determined whether the location fix generated at block 102 is nearer a "safe" or "not safe" designated area. If the mobile station is nearer a "safe" location than it is to a "not safe" location, then the cellular handset is considered to be "safe" and a location fix rate timer is set to a first time, for example, 5 minutes, at block 106.

If the mobile station is nearer a "not safe" location than it is to a "safe" location, then it is considered "not safe" and a determination is made as to whether the current time is within the specified TOD, for example between 9:00 pm and 6:00 am, at block 108.

If the time is not within the specified TOD at block 108, then the location rate timer is set for the time interval specified at block 106, otherwise the location rate timer is set to a another time interval, for example 1 minute, specified at block 112. After the set timer expires at block 114, another location fix is generated at block 102. The TOD variable consideration at block 108 may also be applied to the alternative algorithm of block 104 discussed above.

As noted, software implementing the algorithm of FIG. 4 may readily be implemented on the cellular handset or at the network.

In some embodiments of the invention, the location fix generation rate is provided to the mobile station by the cellular communication network. In one application, for example, the communication network may specify a location fix generation rate for a particular area or to ensure compliance with E-911 positioning mandates.

In another application, an E-911 system operator may specify, through the cellular communication network, the location fix generation rate for a particular geographical area, for example an area subject to the occurrence of a natural disaster or civil unrest, from which a spate of E-911 calls is anticipated and for which quick and accurate positioning determinations are required. In this exemplary application, the E-911 operator increases the location fix generation rate to provide relatively prompt location identification of anticipated E-911 callers.

In some embodiments, a location fix generation rate specified by the network overrides the location fix generation rate specified at the handset. In some embodiments, the satellite positioning system location feature of the mobile station and the source of the predominant location fix generation rate are selectable by the user, for example by making entries in a mobile station configuration menu.

In one implementation, a location fix generation rate specified by the cellular communication network, overrides a default location fix rate or a rate specified by the user. In another implementation, a location fix generation rate based on the velocity of the mobile station overrides the default rate or the rate specified by the user, for example where the rate based on velocity is greater than the default rate or the rate specified by the user.

In another implementation, the cellular handset may be programmed to adopt a higher location fix generation rate when the cellular phone is powered by means other than a battery, for example, from an auxiliary power supply plugged into a wall outlet or vehicle adapter. Thus the variable condition in this embodiment is whether or not battery power is used.

While the present invention has been described hereinabove to enable those of ordinary skill in the art to make and use what is presently considered to be the best modes thereof, those of ordinary skill will understand and appreciate that equivalents, modifications and variations may be made thereto without departing from the scope and spirit thereof, which is to be limited not by the exemplary embodiments disclosed herein but by the appended claims.

What is claimed is:

1. A method for locating a satellite positioning system enabled mobile station in a geographical area, comprising:

specifying different satellite positioning system based location fix generation rates for corresponding portions of the geographical area;

determining within which portion of the geographical area the mobile station is located;

receiving satellite signals at the mobile station for generating satellite positioning system based location fixes of the mobile station at the rate specified for the portion of the geographical area within which the mobile station is located.

2. The method of claim 1, the mobile station is a GPS enabled cellular handset and the geographical area includes a cellular communication network, specifying a GPS based location fix generation rate for a portion of the cellular communication network that is different from a GPS based location fix generation rate specified for another portion of the cellular communication network;

determining within which portion of the cellular communication network the cellular handset is located;

receiving satellite signals at the cellular handset at a rate for generating satellite positioning system based location fixes of the cellular handset at the rate specified for the portion of the cellular communication network within which the mobile station is located.

3. The method of claim 2, determining the portion of the cellular communication network within which the cellular handset is located by generating a GPS based location fix of the cellular handset.

4. The method of claim 2, specifying the GPS based location fix generation rate from the cellular communication network.

5. The method of claim 2, specifying the GPS based location fix generation rate from the cellular handset.

6. The method of claim 2, specifying the GPS based location fix generation rate based on an identification of a base station serving the cellular handset.

7. The method of claim 2, specifying the GPS based location fix generation rate based on a time of day.

8. The method of claim 2, determining a velocity of the cellular handset, specifying a GPS based location fix generation rate based on the velocity of the cellular handset, generating the GPS based location fix at the higher of the rate based on the velocity of the cellular handset and the rate specified for the portion of the cellular communication network within which the cellular handset is located.

9. A method for locating a satellite position system enabled mobile station, comprising:

determining a velocity of the mobile station;

receiving satellite signals at the mobile station at a rate based on a velocity of the mobile station;

generating satellite positioning system based location fixes of the mobile station based on the satellite signals at a rate based on the velocity of the mobile station.

10. The method of claim 9, the satellite positioning system enabled mobile station is a cellular handset in a cellular communication network, determining the velocity of the cellular handset by measuring a fading pitch of a cellular communication network signal at the mobile station.

11. The method of claim 9, increasing the location fix generation rate in an increasing proportion to increases in the velocity of the mobile station, decreasing the location fix generation rate in a decreasing proportion to decreases in the velocity of the mobile station.

12. A method for locating a satellite positioning system enabled mobile station, comprising:

specifying a variable satellite positioning system based location fix generation rate based on a variable condition;

monitoring the variable condition;

receiving satellite signals at the mobile station at a rate for generating a location fix of the mobile station at the rate specified by the variable satellite positioning system based location fix generation rate corresponding to the variable condition monitored.

13. The method of claim 12, the mobile station is a cellular handset, specifying the location fix generation rate based on the portion of the cellular communication network within which the cellular handset is located, determining within which portion of the cellular communication network the cellular handset is located, receiving satellite signals at the cellular handset at a rate for generating location fixes of the cellular handset at the location fix generation rate specified for the portion of the cellular communication network within which the cellular handset is located.

14. The method of claim 13, making the variable satellite positioning system based location fix generation rate dependent upon a velocity of the cellular handset, determining a velocity of the cellular handset, receiving satellite signals at the handset at a rate for generating the location fix of the cellular handset at a rate based on the velocity of the cellular handset.

15. The method of claim 14, determining the velocity of the cellular handset by measuring a fading pitch of a cellular communication network signal.

16. The method of claim 13, specifying the variable satellite positioning system based location fix generation rate at the cellular handset, monitoring the variable condition at the cellular handset.

17. The method of claim 13, controlling the variable satellite positioning system based location fix generation rate from the cellular communication network.

18. The method of claim 13, specifying the variable satellite positioning system based location fix generation rate based on a continuously variable condition.

19. The method of claim 13, specifying the variable satellite positioning system based location fix generation rate based on a discretely variable condition.

20. The method of claim 13, specifying the variable satellite positioning system based location fix generation rate from the cellular communication network.

21. A method for locating a satellite positioning system enabled mobile station in a geographical area, comprising:

specifying different satellite positioning system based location fix generation rates for corresponding time periods;

determining a present time period;

receiving satellite signals at the mobile station for generating satellite positioning system based location fixes of the mobile station at the rate specified for the present time period.

22. A satellite positioning system enabled mobile station, comprising:

a satellite positioning system signal reception interface;

an information processor coupled to the satellite positioning system signal reception interface and the memory, the information processor controlling the satellite positioning system signal reception interface for receiving satellite positioning system signals, upon which mobile station positioning may be determined, at a variable rate based upon a variable satellite positioning system based position fix generation rate instruction.

23. The mobile station of claim 22 is a satellite positioning system enabled cellular handset comprising a wireless communication network interface coupled to the information processor.

24. The mobile station of claim 23, a memory in the cellular handset for storing a satellite positioning system based position fix generation rate instructions that vary with a variable condition.

25. The mobile station of claim 23, the satellite positioning system based position fix generation rate instruction specifies a variable satellite positioning system based position fix generation rate as a function of location of the cellular handset in the cellular communication network.

26. The mobile station of claim 23, the satellite positioning system based position fix generation rate instruction specifies the satellite positioning system based position fix generation rate as function of velocity of the mobile station.

27. The mobile station of claim 23, the satellite positioning system based position fix generation rate instruction specifies the satellite positioning system based position fix generation rate as a function of time.

28. The mobile station of claim 23, the satellite positioning system based position fix generation rate information specifies the satellite positioning system based position fix generation rate as a function of an estimated ability of the cellular handset to receive satellites signals.

* * * * *